United States Patent
Shaalan et al.

(10) Patent No.: US 12,163,411 B2
(45) Date of Patent: Dec. 10, 2024

(54) INTELLIGENT COMPLETION CONTROL IN RESERVOIR MODELING

(71) Applicant: Saudi Arabian Oil Company, Dhahran (SA)

(72) Inventors: Tareq Shaalan, Dhahran (SA); Zhen Chen, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 71 days.

(21) Appl. No.: 16/728,569

(22) Filed: Dec. 27, 2019

(65) Prior Publication Data

US 2021/0198981 A1    Jul. 1, 2021

(51) Int. Cl.
*G06F 30/28* (2020.01)
*E21B 34/06* (2006.01)
(Continued)

(52) U.S. Cl.
CPC .............. *E21B 44/00* (2013.01); *E21B 34/06* (2013.01); *E21B 47/06* (2013.01); *G06F 30/28* (2020.01);
(Continued)

(58) Field of Classification Search
CPC ...... E21B 41/0092; E21B 34/06; E21B 44/00; E21B 47/06; E21B 2200/06; G06F 30/28; G06F 2111/10; G06F 17/16
See application file for complete search history.

(56) References Cited

U.S. PATENT DOCUMENTS 5,992,519 A    11/1999  Ramakrishnan et al.
8,463,585 B2 *  6/2013  Sun .......................... E21B 43/00
                                                        166/278
(Continued)

FOREIGN PATENT DOCUMENTS

CN    100489558 C  *  5/2009  ............. E21B 43/00
CN    101496027 A  *  7/2009  ......... G06F 17/5018
(Continued)

OTHER PUBLICATIONS

Yuanlin Jiang; "Techniques for modeling complex reservoirs and advanced wells"; A Dissertation Submitted To the Department of Energy Resources Engineering (Year: 2007).*
(Continued)

*Primary Examiner* — Rehana Perveen
*Assistant Examiner* — Nupur Debnath
(74) *Attorney, Agent, or Firm* — Fish & Richardson P.C.

(57) ABSTRACT

Methods, systems, and computer-readable medium to perform operations for simulating performance of a reservoir that includes a wellbore. The operations include determining a constraint for an intelligent completion in a model of the wellbore, where the constraint includes a condition and a responsive action. The operations further include performing, in response to determining that the condition is satisfied, the responsive action. Further, the operations include determining, in response to performing the responsive action, transfer equations for the model of the wellbore. Yet further, the operations include building, using the transfer equations, a wellbore computation matrix for the model of the wellbore. In addition, the operations include solving the wellbore computation matrix and determining that a solution to the wellbore computation matrix has converged to an acceptable tolerance. The operations also include responsively deter-
(Continued)

mining that the converged solution is indicative of flow in the model of the wellbore.

11 Claims, 16 Drawing Sheets

(51) Int. Cl.
*E21B 44/00* (2006.01)
*E21B 47/06* (2012.01)
*G06F 17/16* (2006.01)
*G06F 111/10* (2020.01)

(52) U.S. Cl.
CPC .......... *E21B 2200/06* (2020.05); *G06F 17/16* (2013.01); *G06F 2111/10* (2020.01)

(56) References Cited

U.S. PATENT DOCUMENTS

| | | | |
|---|---|---|---|
| 9,816,353 B2* | 11/2017 | Rashid | E21B 34/16 |
| 10,125,586 B2* | 11/2018 | Balan | E21B 34/06 |
| 10,191,182 B2* | 1/2019 | Kayode | G06F 30/20 |
| 2010/0051280 A1 | 3/2010 | Akram | |
| 2012/0130696 A1* | 5/2012 | Davidson | G06Q 10/06375 703/10 |
| 2012/0203515 A1* | 8/2012 | Pita | G06T 17/05 703/2 |
| 2012/0278053 A1* | 11/2012 | Garcia | E21B 43/00 703/10 |
| 2014/0262235 A1 | 9/2014 | Rashid et al. | |
| 2015/0066463 A1* | 3/2015 | Shetty | G01V 20/00 703/10 |
| 2015/0161304 A1 | 6/2015 | Vachon | |
| 2016/0281494 A1* | 9/2016 | Shirdel | E21B 33/12 |
| 2017/0177761 A1* | 6/2017 | Early | E21B 41/0092 |
| 2018/0030816 A1* | 2/2018 | DeValve | E21B 41/0092 |
| 2018/0066515 A1* | 3/2018 | Balan | E21B 34/06 |
| 2018/0240021 A1* | 8/2018 | Al-Harbi | E21B 41/0092 |
| 2019/0128102 A1* | 5/2019 | Dogru | G06F 30/20 |
| 2019/0163856 A1* | 5/2019 | Fung | G06F 17/16 |

FOREIGN PATENT DOCUMENTS

| | | | | |
|---|---|---|---|---|
| WO | WO-2017027068 A1 * | 2/2017 | | E21B 41/00 |
| WO | WO-2019094050 A1 * | 5/2019 | | E21B 43/00 |

OTHER PUBLICATIONS

S. Mozaffari et al.; "Heat and Mass transfer modeling in wellbore during Steam Injection Process"; Canadian Journal on Chemical Engineering & Technology vol. 2, No. 1 (Year: 2015).*

Department of Petroleum Engineering, School of Earth Sciences, Stanford University; "Advanced Techniques for Reservoir Simulation and Modeling of Nonconventional Wells"; (Year: 2004).*

Samir Prasun et al.; "Determination and Implication of Ultimate Water Cut in WellSpacing Design for Developed Reservoirs With Water Coning"; Article in Journal of Energy Resources Technology, Transactions of the ASME . Apr. 2018 (Year: 2018).*

Samir Prasun et al.; "A new analytical model of ultimate water cut for light oil reservoirs with bottom-water"; Journal of Oil, Gas and Petrochemical Sciences (Year: 2018).*

J. Wang et al.; "An integrated modular approach to modeling sand production and cavity growth with emphasis on the multiphase flow and 3D effects"; The 41st U.S. Symposium on Rock Mechanics (USRMS) (Year: 2014).*

Ali H. Dogru et al.; "A Next-Generation Parallel Reservoir Simulator for Giant Reservoirs"; SPE 119272; SPE Reservoir Simulation Symposium in The Woodlands, Texas, USA, Feb. 2-4, 2009. (Year: 2009).*

Quanshu Zeng et al.; "A novel autonomous inflow control device design and its performance prediction"; Journal of Petroleum Science and Engineering 126 (2015) 35-47 (Year: 2015).*

Lin Zhao et al.; "Design and Performance of a Novel Autonomous Inflow Control Device"; Energy Fuels 2018, 32, 125-131 (Year: 2018).*

Wordu, A. A; "Predicting Momentum Effects of Fluid Flow in Reservoir Well Bore in Niger Delta Area"; International Journal of Latest Technology in Engineering, Management & Applied Science (IJLTEMAS), vol. VIII, Issue III, Mar. 2019 | ISSN 2278-2540 (Year: 2019).*

Mahdy Shirdel; "Development of a Coupled Wellbore-Reservoir Compositional Simulator for Horizontal Wells"; (Year: 2010).*

Himadri Chattopadhyay et al.; "Analysis of flow structure inside a spool type pressure regulating valve"; Energy Conversion and Management 53 (2012) 196-204 (Year: 2012).*

R. Amirante et al.; "Flow forces analysis of an open center hydraulic directional control valve sliding spool"; Energy Conversion and Management 47 (2006) 114-131 (Year: 2006).*

O.M.H. Rodriguez et al.; "Experimental study on oil-water flow in horizontal and slightly inclined pipes"; International Journal of Multiphase Flow 32 (2006) 323-343 (Year: 2006).*

"The Saudi ARAMCO Journal of Technology" A quarterly publication of the Saudi Arabian Oil Company; Summer 2017 (Year: 2017).*

Faisal Turki Manee Al-Khelaiwi; "A Comprehensive Approach to the Design of Advanced Well Completions"; A thesis submitted for the degree of Doctor of Philosophy (Year: 2013).*

PCT International Search Report and Written Opinion in International Appln. No. PCT/US2020/065524, dated Mar. 30, 2021, 17 pages.

Chen et al. "Modelling of Flow Control Devices in Smart Well Applications With Total Field Optimization," Society of Petroleum Engineers; SPE-18449-MS.

Yeten et al., "Optimization of Smart Well Control" SPE/PS-CIM/CHOA International Thermal Operations and Heavy Oil Symposium and International Horizontal Well Technology Conference Nov. 4-7, 2002.

Al-Shaalan et al., "Parallel Computation for complex wells modeling in full-field reservoir simulation," SPE-182657-MS, presented at the SPE Reservoir Simulation Conference, Montgomery, TX, 11 pages.

\* cited by examiner

```
┌─────────────────────────────────────────────────┐
│ DETERMINING A CONSTRAINT FOR AN INTELLIGENT     │
│ COMPLETION IN A MODEL OF THE WELLBORE, WHEREIN  │
│ THE CONSTRAINT COMPRISES A CONDITION AND A      │
│ RESPONSIVE ACTION                        502    │
└─────────────────────────────────────────────────┘
                        ↓
┌─────────────────────────────────────────────────┐
│ PERFORMING, IN RESPONSE TO DETERMINING THAT THE │
│ CONDITION IS SATISFIED, THE RESPONSIVE ACTION   │
│                                          504    │
└─────────────────────────────────────────────────┘
                        ↓
┌─────────────────────────────────────────────────┐
│ DETERMINING, IN RESPONSE TO PERFORMING THE      │
│ RESPONSIVE ACTION, TRANSFER EQUATIONS FOR THE   │
│ MODEL OF THE WELLBORE                           │
│                                          506    │
└─────────────────────────────────────────────────┘
                        ↓
┌─────────────────────────────────────────────────┐
│ BUILDING, USING THE TRANSFER EQUATIONS, A       │
│ WELLBORE COMPUTATION MATRIX FOR THE MODEL OF    │
│ THE WELLBORE                                    │
│                                          508    │
└─────────────────────────────────────────────────┘
                        ↓
┌─────────────────────────────────────────────────┐
│ SOLVING THE WELLBORE COMPUTATION MATRIX AND     │
│ DETERMINING THAT A SOLUTION TO THE WELLBORE     │
│ COMPUTATION MATRIX HAS CONVERGED TO AN          │
│ ACCEPTABLE TOLERANCE                     510    │
└─────────────────────────────────────────────────┘
                        ↓
┌─────────────────────────────────────────────────┐
│ RESPONSIVELY DETERMINING THAT THE CONVERGED     │
│ SOLUTION IS INDICATIVE OF FLOW IN THE MODEL OF  │
│ THE WELLBORE                                    │
│                                          512    │
└─────────────────────────────────────────────────┘
```

FIG. 5

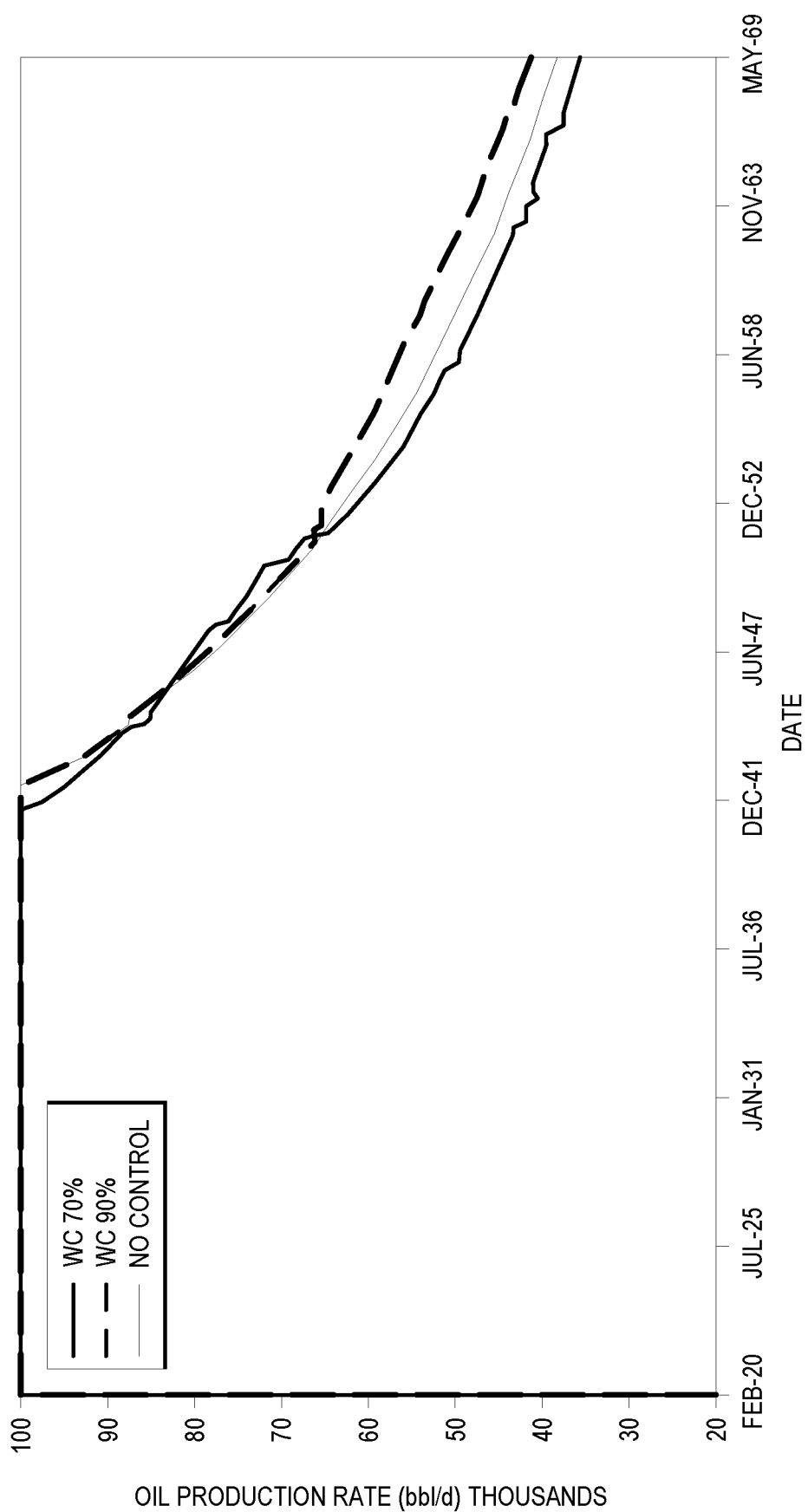

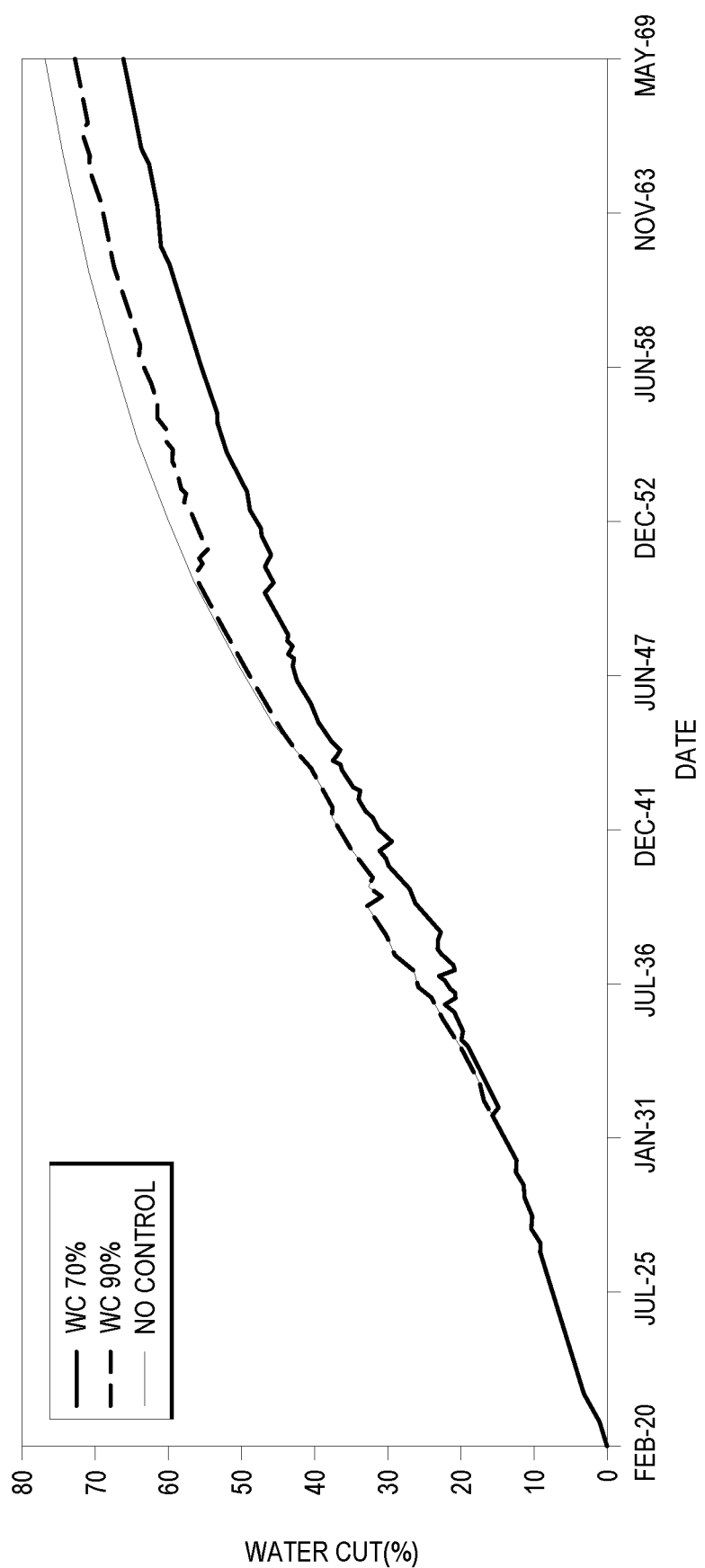

INTELLIGENT COMPLETION CONTROL IN RESERVOIR MODELING

TECHNICAL FIELD

The present disclosure relates to simulation of hydrocarbon reservoirs, and in particular to simulation of reservoirs with complex wells.

BACKGROUND

Flow control devices (FCDs), such as inflow control devices (ICDs) and interval control valves (ICVs), have many applications in both conventional reservoirs and unconventional reservoirs (for example, any reservoir that requires special recovery operations outside conventional operating practices, such as tight-gas sands, gas and oil shales, coalbed methane, heavy oil and tar sands, and gas-hydrate deposits). For example, FCDs are used to mitigate water or gas-coning problems for mature fields in conventional reservoirs, alleviate premature water breakthrough in naturally fractured reservoirs, and optimize steam distribution in heavy oil reservoirs. Due to their many applications, FCDs are increasingly being installed in production fields as part of "intelligent completions," particularly in complex wells (for example, any well designed with engineering or application challenges that are outside conventional practices). Intelligent completions refer to well components that are equipped with intelligent technology, such as ICVs, ICDs, and autonomous gas stops. Example complex wells that use FCDs, for example, to control intelligent completions, include ultra-deep (for example, with drilling depths up to 15 kilometers (km)) and long horizontal extended-reach drilling (ERD) wells (for example, with reservoir contacts up to or greater than 10 km), wells with completions in multi-layer reservoirs (for example, Maximum Reservoir Contact (MRC) wells with an aggregate reservoir contact in excess of 5 km), and multilateral wells with isolated compartments of varying pressure. Computationally simulating flow through complex wells can assist with improving understating of flow through and production of such wells.

SUMMARY

An aspect in complex well modeling is the modeling of flow control devices (FCDs). In practice, some complex well models use vertical flow performance (VFP) tables to model FCDs. A VFP table is a table of the pressure traverse in the vertical or inclined tubing of a production system. The table includes the pressure losses vs. production rate and other factors affecting lift performance, such as gas-oil ratio (GOR) and water-oil ratio (WOR). However, such tables are static and do not capture the dynamic behavior of FCDs. During real operations, FCDs are controlled in real-time to mitigate problems, such as water coning. For example, interval control valves (ICVs) are active devices whose choking sizes can be changed based on dynamic factors in the complex well. ICVs can also be choked in high flux regions to promote even production along the wellbore and can be adjusted to avoid early water breakthrough. This disclosure describes techniques that enable autonomously simulating this real-time control in reservoir simulators.

This disclosure describes a framework that reactively controls FCDs of a complex well during reservoir simulations, thereby simulating the control of FCDs as would be done in real operations. The framework does so by transforming the real-time control of FCDs and the dynamic condition of the wellbore flow into conditional logical constraint equations on a model of the complex well. The framework then iteratively solves the constraint equations with mass balance and momentum balance equations of the model until a converged solution is reached. Also, this disclosure describes several examples that apply the disclosed framework. The examples illustrate that the application of field-level device control in complex wells has the benefit of improved overall gas-oil separation plant (GOSP) performance.

Aspects of the subject matter described in this specification may be embodied in methods that include the operations for simulating performance of a reservoir that includes a wellbore. The operations include determining a constraint for an intelligent completion in a model of the wellbore, where the constraint includes a condition and a responsive action. The operations further include performing, in response to determining that the condition is satisfied, the responsive action. Further, the operations include determining, in response to performing the responsive action, transfer equations for the model of the wellbore. Yet further, the operations include building, using the transfer equations, a wellbore computation matrix for the model of the wellbore. In addition, the operations include solving the wellbore computation matrix and determining that a solution to the wellbore computation matrix has converged to an acceptable tolerance. The operations also include responsively determining that the converged solution is indicative of flow in the model of the wellbore.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In a first aspect, the acceptable tolerance is a first acceptable tolerance, and further including: building a reservoir computation matrix for a model of the reservoir; solving the reservoir computation matrix and determining that a solution to the reservoir computation matrix has converged to a second acceptable tolerance; and responsively determining that the converged solution is indicative of flow in the model of the reservoir.

In a second aspect, further including: determining, based on the converged solution, a location of a well to be drilled; and drilling, based on the determination of the location of the well to be drilled, the well at the determined location.

In a third aspect, where the transfer equations include a mass balance equation and momentum balance equation for the intelligent completion.

In a fourth aspect, wherein determining transfer equations for the model of the wellbore includes: calculating a pressure drop through the intelligent completion, wherein the pressure drop through the intelligent completion comprises a pressure drop through a flow control device of the intelligent completion.

In a fifth aspect, where the responsive action includes at least one of: changing a status of the intelligent completion or gradually choking the intelligent completion.

In a sixth aspect, where the model of the wellbore is a complex well network that is generated using a general network approach.

The subject matter described in this specification can be implemented in particular implementations, so as to realize one or more of the following advantages. The disclosed framework facilitates the understanding of wellbore dynamics of complex wells by simulating the full physics (for example, friction, acceleration, and mechanical devices) of the complex well. Additionally, the disclosed framework has the capability of simulating real-time device control of intelligent completions without repeatedly running simulations with different static device settings. Thus, the disclosed framework reduces the requirement of running tens to hundreds of iterations in predictive control to determine optimal settings for intelligent completions. Also, the real-time device control is reactive and responsive in real-time. This is similar to real-time operations and results in computational cost savings. In addition, the disclosed device control helps operators make more reliable decisions. For example, studies performed in a simulated environment before implementation in real operations can help achieve optimal performances and avoid costly mistakes. Further, the disclosed framework not only applies to controlling mechanical devices reactively, but can also be extended to control other completions (for example, well, branch, and perforations) in well modelling. The integration of autonomous device control in reservoir simulation reduces the time needed in the full cycle from reservoir simulation to operational optimization.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 5 illustrates a flowchart of an example method for simulating performance of a complex well that includes intelligent completions, according to some implementations of the present disclosure.

FIGS. 12, 13, 14A, 14B, and 15 illustrate results of a second simulation example that implements the disclosed framework, according to some implementations of the present disclosure.

Like reference numbers and designations in the various drawings indicate like elements.

DETAILED DESCRIPTION

In the last several decades, complex wells with intelligent completions controlled by flow-control devices (FCDs) have been increasingly utilized in hydrocarbon production operations. Example complex wells include horizontal, multilateral, maximum reservoir contact (MRC), and extended reach drilling (ERD) wells. One way to understand the wellbore dynamics of such wells (for example, the intricate wellbore flows) is to simulate the full physics of the wells (for example, fluid friction, fluid acceleration, and behavior of mechanical devices). Additionally, modeling complex wells is important for developing a production strategy, history-matching production, and predicting future production. One aspect of complex well modeling is the modeling of the FCDs (for example, ICDs and ICVs). In order to simulate the wellbore dynamics of a complex well accurately, a complex well model must account for the behavior of these devices.

This disclosure describes a framework for modeling and reactively controlling intelligent completions during reservoir simulations. In particular, the framework reactively and autonomously controls the intelligent completions during reservoir simulations in order to model the dynamic nature of the intelligent completions. In order to do so, the framework uses constraint equations to model the real-time intelligent completion control. The framework is flexible and comprehensive for modeling the control of intelligent completions systematically from well level to perforation level.

Figure 1:
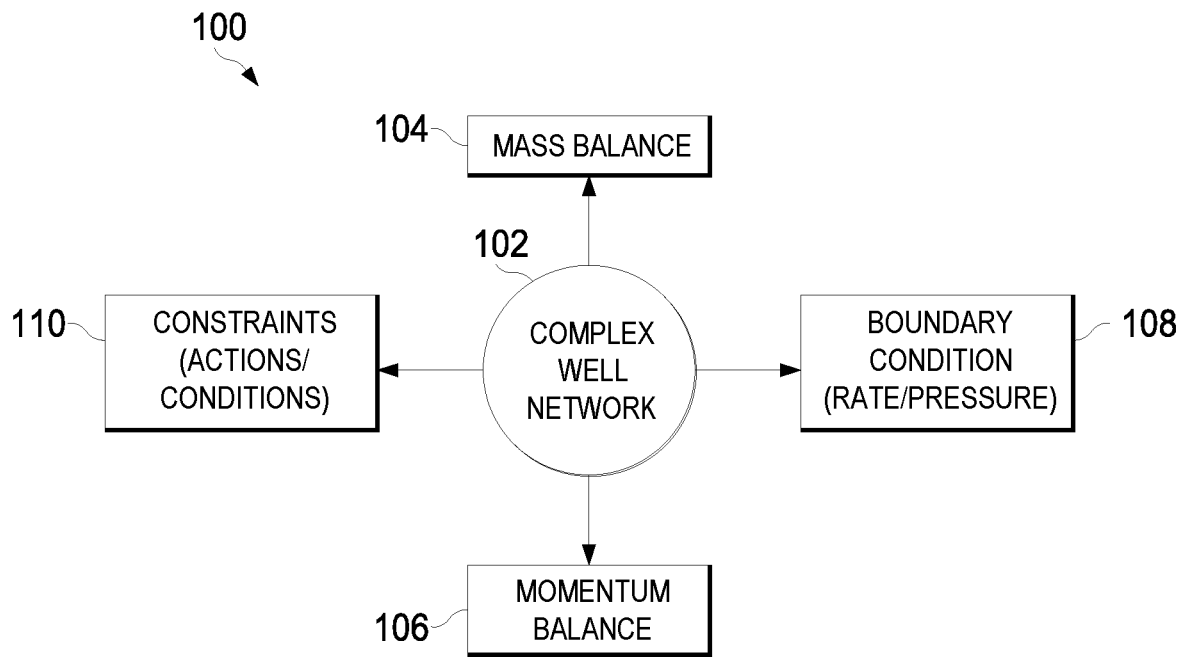
FIG. 1 illustrates a framework for modeling complex wells that include intelligent completions, according to some implementations of the present disclosure.

FIG. 1 illustrates a framework 100 for modeling complex wells that include intelligent completions, according to some implementations. As described below, the framework 100 facilitates reactively controlling intelligent completions during a reservoir simulation. In order to do so, the framework 100 addresses three aspects of the simulation. First, the framework 100 defines how the complex well and the associated intelligent completions are modeled. Second, the framework 100 defines how the intelligent completions are controlled during the reservoir simulation. Third, the framework 100 defines how performance of the complex well is simulated.

With respect to the first aspect, wells can generally be modeled using a general network approach or a segmentation approach. In the framework 100, the general network approach is used since this approach better handles the complex topology of complex wells (for example, multi-branching, loops, and multiple exits). The general network approach divides the complex well into links and nodes in order to generate a complex well network 102 as a model of the complex well. In the complex well network 102, wellbore segments, completions (for example, pipes), and mechanical devices (for example, ICDs, ICVs, and electric submersible pumps) are represented using links. The connection points of the links are represented using nodes.

Figure 2:
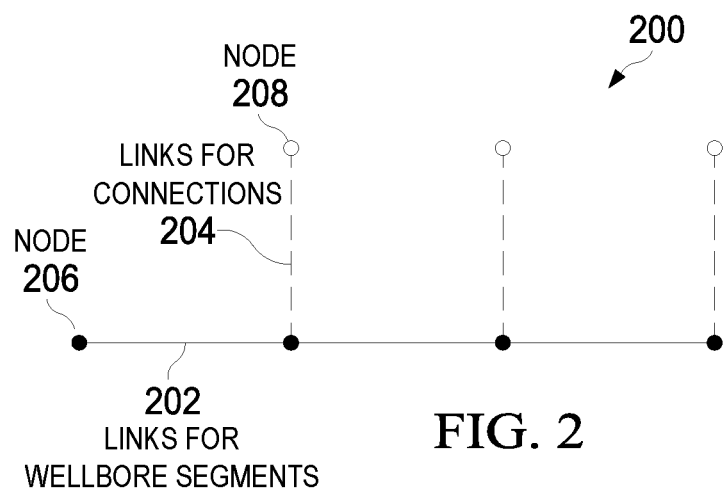
FIG. 2 illustrates an example model that is generated using the general network approach, according to some implementations

FIG. 2 illustrates an example model 200 that is generated using the general network approach, according to some implementations. As shown in FIG. 2, the model 200 includes links, such as links 202 and 204, and nodes, such as nodes 206 and 208. In the model 200, some links, such as link 202, represent wellbore segments. The nodes, such as node 206, represent the connection points of the links. Furthermore, some links, such as link 204, represent connections between nodes. For example, link 204 represents a connection between nodes 206 and 208.

Returning to the framework 100, and with respect to the second aspect, the framework 100 controls the intelligent completions by imposing constraints 110 on each intelligent completion in the complex well network 102. The constraints 110 define how each intelligent completion reacts in response to reservoir conditions. Each constraint includes a condition and an action. The condition is a logical expression that determines whether a specific operational condition (for example, a reservoir condition) is met. The condition can be an equality, an inequality, or a combination of multiple conditions using logical operators. An action is a dynamic reaction of an intelligent completion in response to a given condition. Accordingly, operational conditions serve as triggers for the intelligent completions to perform actions. The action can be adjusting a status (for example, open or close), one or more settings, or both of an intelligent completion. As such, the constraints 110 facilitate dynamically controlling intelligent completions based on changes in reservoir conditions (similar to how intelligent completions are controlled in real operations).

In an implementation, the constraints 110 are defined in a simulation input file. Example operational conditions include a water cut above a certain limit (for example, 50%), a water rate above or below a desired value, and an oil rate above or below a desired value. Example actions include changing a status of the intelligent completion (for example, open or close) or gradually choking the intelligent completion. The action taken will eventually make the system reach an equilibrium where all the specified conditions are met. An example constraint is that when water cut in a well or a lateral exceeds a predetermined limit (for example, 70%), an ICV in that well or lateral is choked until the water cut is below the limit. Another example constraint is that an intelligent completion that has maximum water cut in a well is selectively choked.

With respect to the third aspect, the framework 100 uses transfer equations to characterize performance of the complex well network 102. In particular, the framework 100 uses mass balance equations 104 and momentum balance equations 106 to characterize flow in the complex well network 102. The mass balance equations 104 represent the flow that enters or exits each link and node. The momentum balance equations 106 represent the magnitude and direction of the flow through the links and nodes. In these equations, molar rate and mole fractions are the primary variables on links and pressure is the primary variable on nodes. Furthermore, the pipe and annulus flow in the complex well network 102 can be modeled either as multiphase flow (for example, using a mechanistic model) or as homogenous single-phase flow. Additionally, the complex well network 102 uses a unified compositional formulation to handle black-oil simulations and multi-component compositional simulations.

Generally, the mass balance equations 104 and the momentum balance equations 106 for intelligent completions are defined similar to those for wellbore segments. However, in order to account for the effect of intelligent completions on flow, the momentum balance equations 106 use additional terms for pressure drop across the intelligent completions. As such, the mass balance equation for an intelligent completion, like a mass balance equation for a wellbore segment, equalizes the inflow of total molar rate to the outflow of total molar rate, as shown by Equation (1):

$$\Sigma N_{in} = \Sigma N_{out}. \tag{1}$$

The momentum balance equation for an intelligent completion solves the pressure drop relationship, as shown by Equation (2):

$$\Delta P_{total} = \Delta P_{friction} + \Delta P_{gravity} + \Delta P_{device}. \tag{2}$$

In Equation (2), the total pressure drop is equal to a sum of the pressure drop due to friction in the intelligent completion ($\Delta P_{friction}$), the pressure drop due to gravity ($\Delta P_{gravity}$), and the pressure drop due to an FCD of the intelligent completion ($\Delta P_{device}$). The value of the pressure drop across the FCD depends on how the device is modeled. An ICV can be modeled either as an inline ICV or as a sliding type ICV. The modeling of ICDs is similar to the modeling of sliding type ICVs.

Figure 3A:
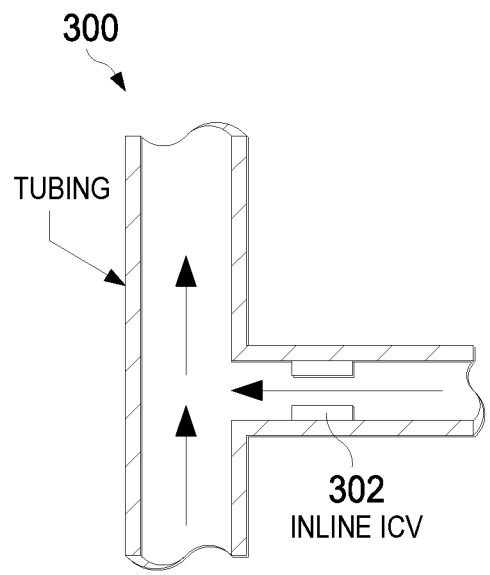
FIG. 3A illustrates a diagram of an inline interval control valve, according to some implementations of the present disclosure.
Figure 3B:
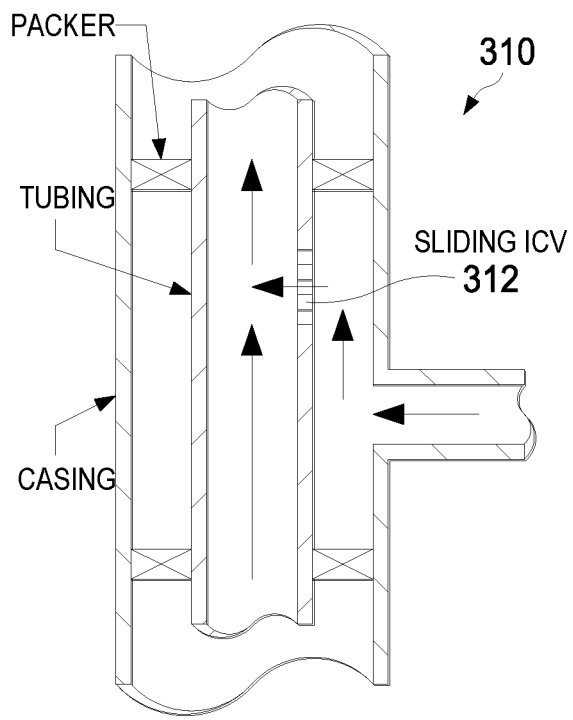
FIG. 3B illustrates a diagram of a sliding interval control valve, according to some implementations of the present disclosure.

FIG. 3A illustrates a diagram 300 of an inline ICV 302, and FIG. 3B illustrates a diagram 310 of a sliding type ICV 312, according to some implementations. When modeling the inline ICV 302 using the general network approach, the inline ICV 302 shares a link with a pipe link. Conversely, when modeling the sliding type ICV 312, the sliding type ICV 312 has its own link to connect the flow from a compartment to a tubing.

Although the modeling of ICDs is similar to the modeling of sliding type ICVs, the flow in ICDs and ICVs can be different. The flow through ICVs is typically modeled using a nozzle/orifice model. ICDs, on the other hand, are more diversified in their access types. There are three types of ICDs: (i) nozzle/orifice, (ii) channel (for example, Labyrinth devices), and (iii) hybrid (combination of nozzle/orifice and channel designs). Nozzle/orifice ICDs and ICVs are both modeled as subcritical valves. In subcritical valves, the additional pressure drop created by flow through the constriction is proportional to the fluid density and velocity through the valve area. The pressure drop of such devices is defined by Equation (3) as:

$$\Delta P_{device} = \frac{1}{C_v^2} \rho V^2 = \frac{\rho Q^2}{(AC_v)^2}. \tag{3}$$

In Equation (3), $C_v$ is a loss coefficient, $\rho$ is a mixture density, V is a mixture velocity, A is the cross-sectional area of the nozzle, and Q is the fluid flow rate through the nozzle.

Channel ICDs use surface friction to control flow. The friction loss due to the channel length is modeled using a channel loss coefficient ($C_{ch}$) and fluid velocity through the channel ($V_{ch}$). Similar to the pipe and annulus flow, the flow through the channel can be modeled as single-phase flow (for example, using a homogeneous model) or as multiphase flow (for example, using a mechanistic model). The pressure drop of such devices is defined by Equation (4) as:

$$\Delta P_{device} = \frac{1}{C_{ch}^2} \rho V_{ch}^2. \tag{4}$$

In hybrid ICDs, the total pressure loss through the device is a summation of the pressure drop through nozzles due to constriction and the friction loss through the channel due to the channel length. The pressure drop of such devices is defined by Equation (5) as:

$$\Delta P_{device} = \frac{1}{c_v^2} \rho V^2 + \frac{1}{c_{ch}^2} \rho V_{ch}^2. \quad (5)$$

Note that intelligent completions have multiple settings and can be either open or shut. Each device setting or status (for example, open or shut) corresponds to a different value of pressure drop. Thus, during a simulation, the constraints 110 are evaluated, and any resulting actions are performed, prior to generating the mass balance equations 104 and the momentum balance equations 106. Once the mass balance equations 104 and the momentum balance equations 106 are generated, the equations are solved using boundary conditions 108 of well rates and pressures in order to simulate performance of the complex well.

Figure 4:
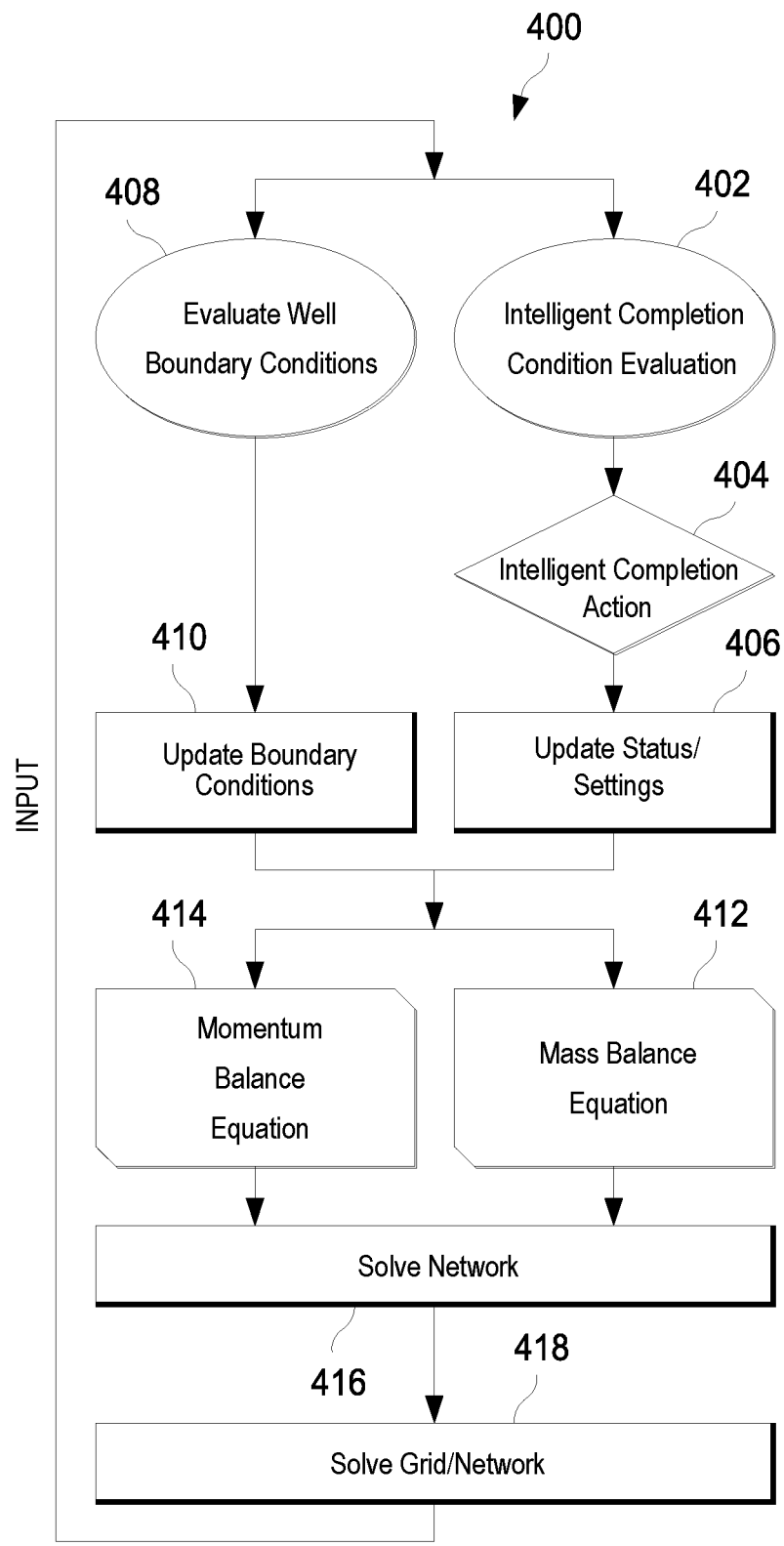
FIG. 4 illustrates a workflow for simulating performance of a complex well that includes intelligent completions, according to some implementations of the present disclosure.

FIG. 4 illustrates a workflow 400 for simulating performance of a reservoir, according to some implementations. The workflow 400 can be performed by any suitable system, environment, software, and hardware, or a combination of systems, environments, software, and hardware, as appropriate. In an example, the workflow 400 is performed by a computing system, such as computing system 1600 of FIG. 16, that is configured to perform reservoir simulations. The computing system performs the workflow 400 in order to simulate performance of a complex well that is located in the reservoir. In this example, the complex well includes an intelligent completion. Furthermore, the complex well is modeled by a complex well network.

As shown in FIG. 4, the workflow 400 includes three stages. In the first stage, which includes steps 402-410, the intelligent completion conditions and the boundary conditions of the complex well are evaluated. Additionally, in this stage, the settings of the intelligent conditions and the boundary conditions are updated. In the second stage, which includes steps 412-416, mass balance equations and momentum balance equations are determined based on the status/settings of the intelligent completion and based on the boundary conditions. Additionally, in this stage, the mass balance equations and the momentum balance equations are solved in order to determine a solution for the complex well network. In the third stage, which includes step 418, the complex well network is coupled with a reservoir simulation. The coupling can be explicit, sequential, or fully implicit. Additionally, in this stage, the reservoir simulation is performed. Note that the steps of the workflow 400 are performed until a solution is converged. For example, a converged solution is one that is within a predetermined allowable tolerance.

As also shown in FIG. 4, the workflow 400 implements a concept similar to feedback control. Specifically, step 402 of intelligent completion condition evaluation uses as input variables of the reservoir and the complex well. The conditions are evaluated using the variables. Then, at step 404, the corresponding actions, if any, are taken. At step 406, the status and settings of the intelligent completion are updated. Steps 402, 404, and 406 are performed simultaneously with steps 416 and 418. Like in step 402, step 416 uses as input and feedback variables of the reservoir and the complex well. In step 416, the complex well boundary conditions are evaluated based on the variables of the reservoir and the complex well. Then, in step 418, the boundary conditions are updated.

Steps 408 and 410 use as input the updated boundary conditions and the updated status/settings of the intelligent completion. In step 408, the mass balance equations for the complex well are determined based on the updated boundary conditions and the updated status/settings of the intelligent completion. In step 410, the momentum balance equations for the complex well are determined based on the updated boundary conditions and the updated status/settings of the intelligent completion. In particular, once the intelligent completion is controlled, the pressure drop through a device of the intelligent completion is calculated. This will be incorporated as the additional pressure drop in the complex well network.

At steps 412 and 414, the complex well network is solved with fully coupled mass and momentum balance equations along with the boundary conditions. The network properties and their derivatives are then calculated to build a Jacobian matrix. The Jacobian matrix includes a system of linear algebraic equations. The computer system can include a network solver for solving the Jacobian matrix. The network solver can implement Newton's method for iteratively solving the Jacobian matrix. At each iteration, Newton's method solves an updated Jacobian matrix. The process is iteratively repeated until the complex well network is solved. The complex well network is solved if the solutions are convergent. The complex well network is solved in an inner Newton step and then coupled with the reservoir simulation in an outer Newton step. The coupling can be explicit, sequential, or fully implicit.

In an embodiment, for explicit coupling, the computer system solves the well network once, and the solution of the well network is fixed for all the Newton iterations in the grid system. After solving for the well network, in each Newton iteration, the computer system updates the residual and solves for the grid system. The solution is then updated. If the solution has converged, the computer system goes to the next time step. Otherwise, the computer system goes back to the Newton iteration.

In an embodiment, for implicit coupling, the computer system solves the well network in each Newton iteration. After the network is solved, the Jacobian matrix for the whole system, including the grid and the well network, is built and the whole system is solved implicitly. If solution is converged, the computer system goes to the next time step. Otherwise, the computer system goes back to the Newton iteration.

FIG. 5 illustrates a flowchart of an example method 500 for simulating performance of a complex well that includes intelligent completions, according to some implementations. For clarity of presentation, the description that follows generally describes method 500 in the context of the other figures in this description. For example, the method 500 can be performed by the computing system 1600 shown in FIG. 16. However, it will be understood that the method 500 may be performed, for example, by any suitable system, environment, software, and hardware, or a combination of systems, environments, software, and hardware, as appropriate. In some implementations, various steps of the method 500 can be run in parallel, in combination, in loops, or in any order.

At step 502, method 500 involves determining a constraint for an intelligent completion in a model of the wellbore, where the constraint comprises a condition and a responsive action.

At step 504, method 500 involves performing, in response to determining that the condition is satisfied, the responsive action.

At step 506, method 500 involves determining, in response to performing the responsive action, transfer equations for the model of the wellbore.

At step 508, method 500 involves building, using the transfer equations, a wellbore computation matrix for the model of the wellbore.

At step 510, method 500 involves solving the wellbore computation matrix and determining that a solution to the wellbore computation matrix has converged to an acceptable tolerance. For example, the wellbore computation matrix is a Jacobian matrix for the model of the wellbore.

At step 512, method 500 involves responsively determining that the converged solution is indicative of flow in the model of the wellbore.

The example method 500 shown in FIG. 5 can be modified or reconfigured to include additional, fewer, or different steps (not shown in FIG. 5), which can be performed in the order shown or in a different order. As an example, after step 512, the method 500 can include building a reservoir computation matrix for a model of the reservoir; solving the reservoir computation matrix and determining whether a solution to the reservoir computation matrix has converged to an acceptable tolerance; and, if the solution to the reservoir computation matrix has converged to the acceptable tolerance, responsively determining that the converged solution is indicative of flow in the model of the reservoir. As another example, the method 500 can include determining, based on the converged solution, a location of a well to be drilled; and drilling, based on the determination of the location of the well to be drilled, the well at the determined location. Yet another example, after step 512, the method 500 can include performing optimizations in the well production system. In an example, the method 500 may involve determining whether to drill a well based on the production potential of the well. In another example, the method 500 can include making a decision to optimally allocate production to a particular well.

Figure 6:
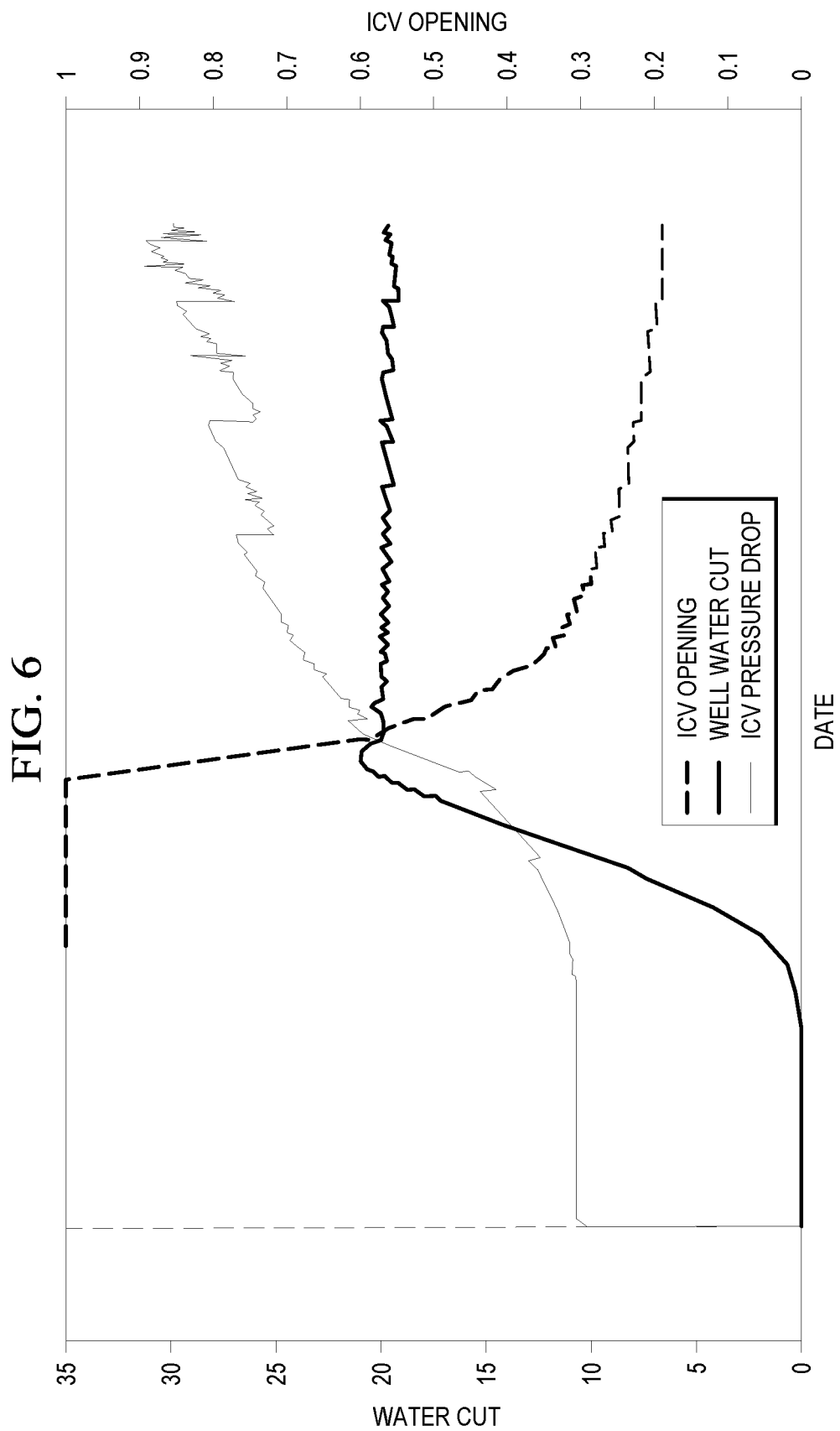
FIG. 6 illustrates a graph of data from a complex well model implementing device control, according to some implementations of the present disclosure.

FIG. 6 illustrates a graph 600 of data from a complex well model implementing device control, according to some implementations. In this example, the condition to trigger ICV control is a well water cut at 20%. The responsive action is that the ICV, which is initially fully open, is choked by 10% each time the water cut exceeds 20%. As shown in FIG. 6, the area of the ICV opening decreases and the pressure of the ICV increases due to reduced constriction area when the ICV is choked. As also shown in FIG. 6, the device control successfully maintains the well water cut below the 20% threshold during the entire simulation.

FIGS. 7, 8, 9, 10, and 11 illustrate a first simulation example that implements the disclosed framework, according to some implementations. The first simulation example is a single-well simulation of single complex well that includes intelligent completions. In this example, performance of the single complex well with ICV control is evaluated.

Figure 7:
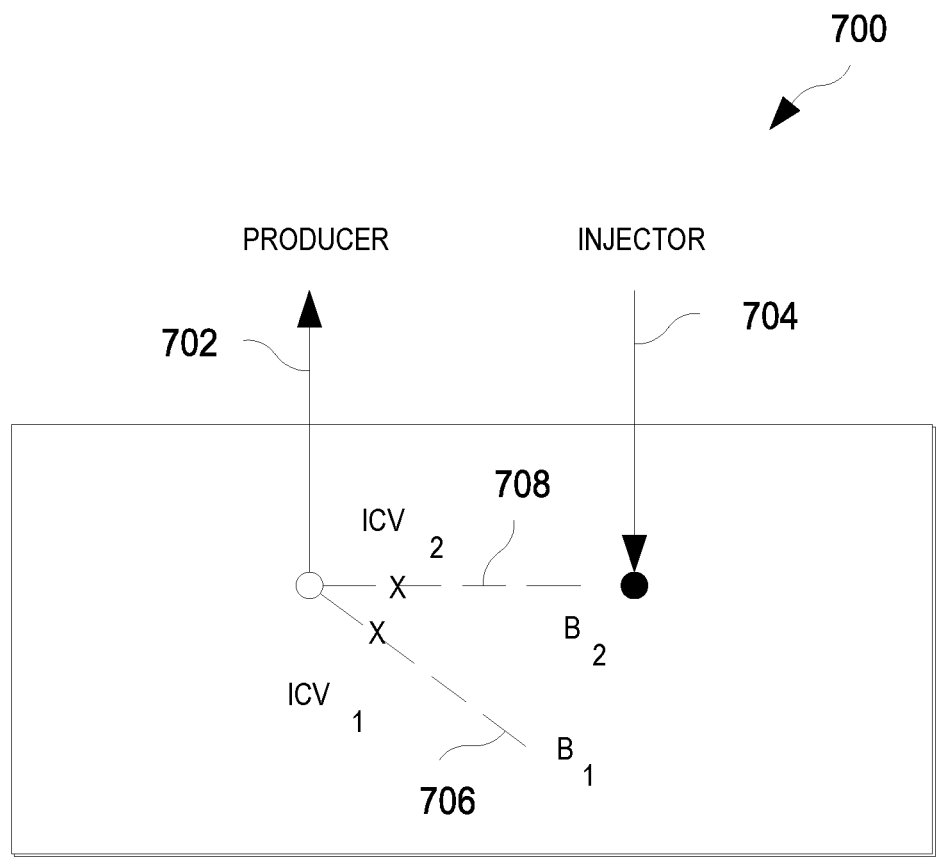
FIGS. 7, 8, 9, 10, and 11 illustrate a first simulation example that implements the disclosed framework, according to some implementations of the present disclosure.

FIG. 7 illustrates a complex well configuration of the single-well simulation. The complex well includes a single horizontal multi-lateral producer 702 and a single vertical injector 704. The multi-lateral producer 702 has two laterals: lateral 706 and lateral 708. Lateral 708 (also identified as branch "B2") is closer to the injector 704 than the lateral 706 (also identified as branch "B1"). Thus, lateral 708 is expected to have earlier water breakthrough than lateral 706. As shown in FIG. 7, the multi-lateral producer 702 includes intelligent completions $ICV_1$ and $ICV_2$, each of which is installed in a respective lateral.

In this example, the simulation model is three-dimensional and has dimensions of 10000×10000×60 ft³. The grid block sizes used in the simulation are 200×200×5 feet. The reservoir is homogenous with 30% porosity, 100 millidarcy (md) horizontal permeability, and 10 md vertical permeability. Furthermore, the simulation is run with and without device control. In both cases, the simulation is run to simulate performance for 18 years. Furthermore, in both cases, the injector injects water at a maximum bottom-hole pressure and the producer runs at a maximum liquid constraint of 10000 barrels per day (bbl/day). In the first case, the simulation is run without any device control for the producer. In the second case, a condition is set to choke the ICV when the well water cut is more than 40%.

Figure 8:
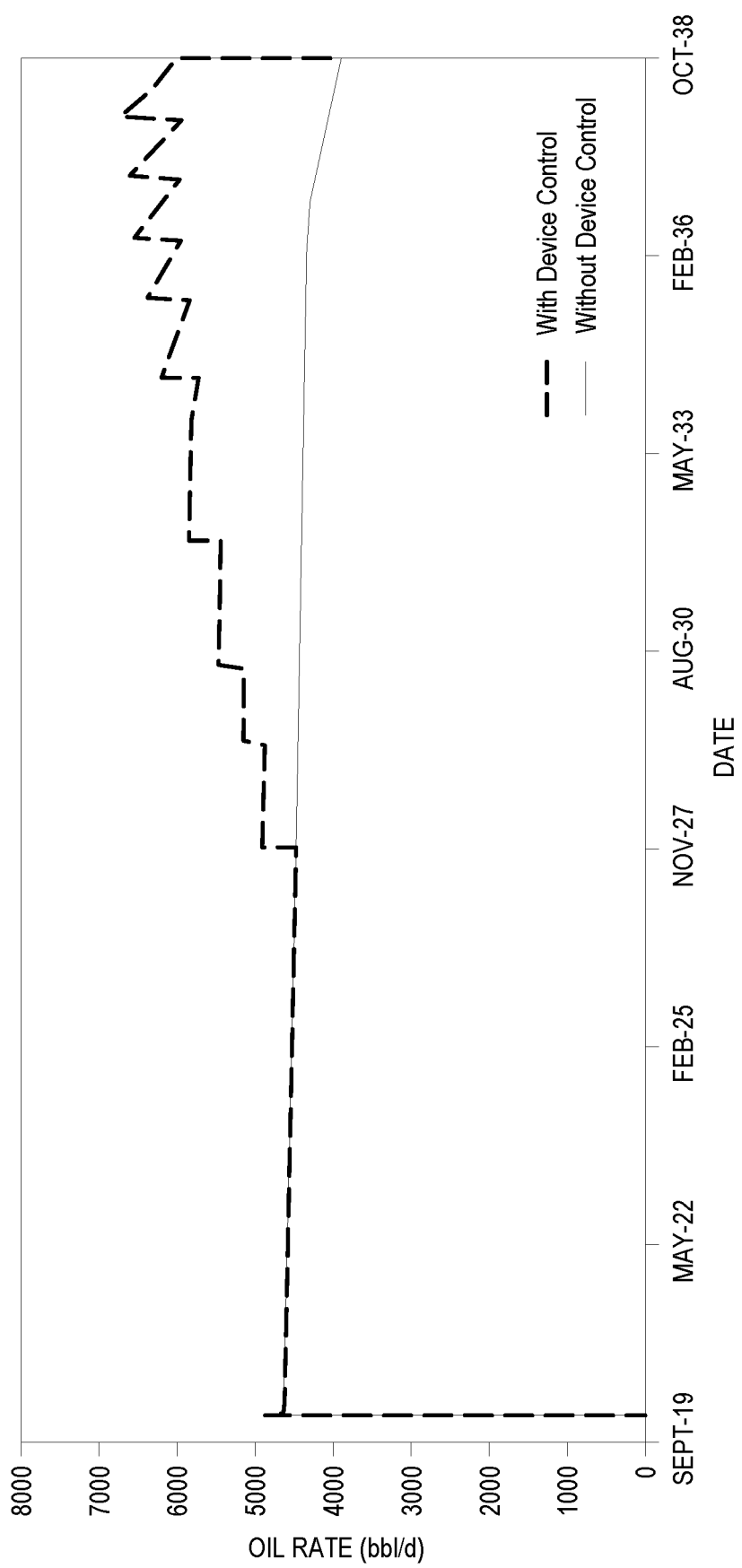
Figure 9:
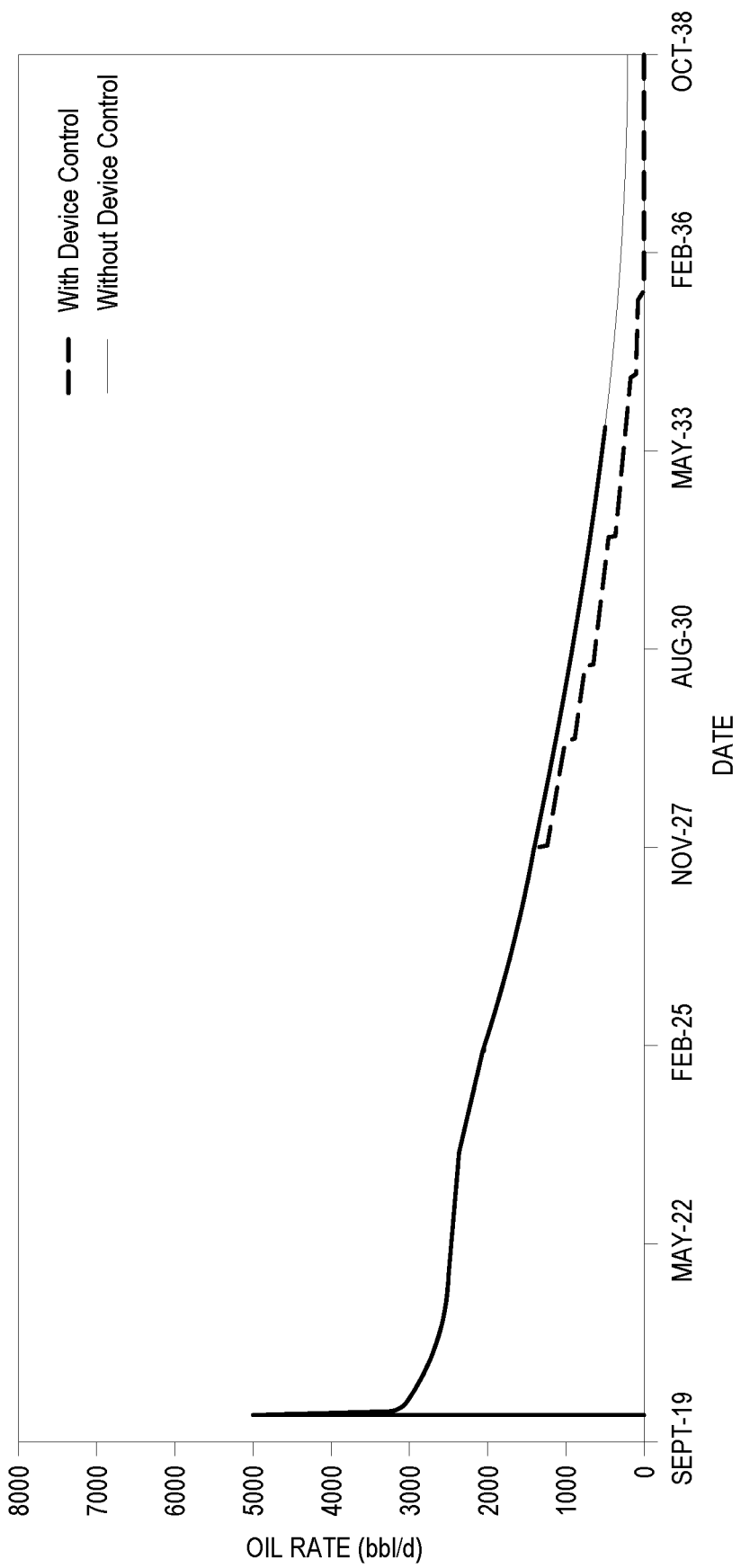

FIGS. 8, 9, 10, and 11 illustrate a performance comparison of the two cases. In the figures, the solid line represents the case without device control and the dotted line represents the case with device control. FIG. 8 and FIG. 9 illustrate the oil production of branch B1 and branch B2, respectively. FIG. 9 shows that branch B2 has much lower oil production than branch B1 because branch B2 is closer to the water injector. In the device control case, the ICV starts choking when the water cut reaches a threshold value. The device control case results in lower oil production than the case without device control. However, the branch B2 with device control will produce at a much higher oil rate than without device control in order to meet the well liquid constraint.

Figure 10:
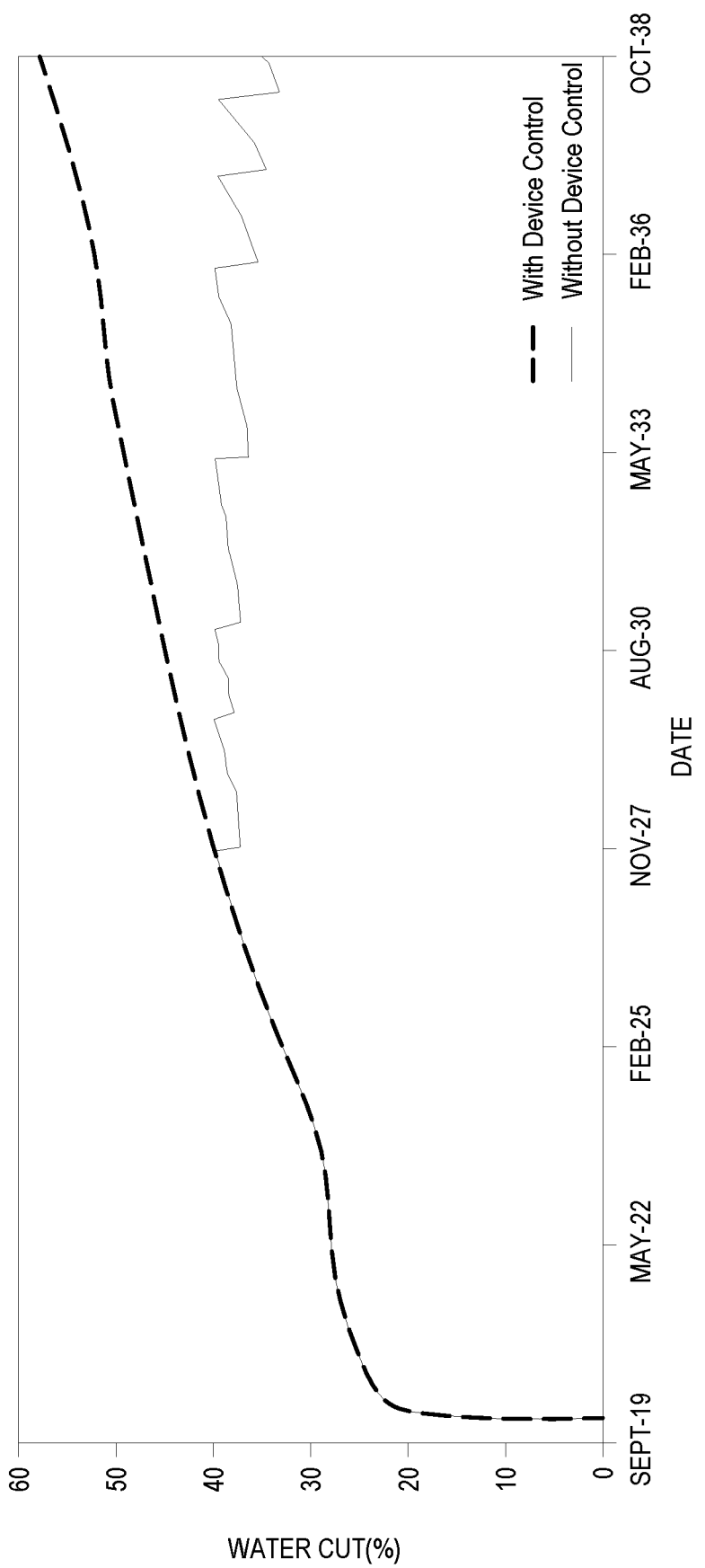
Figure 11:
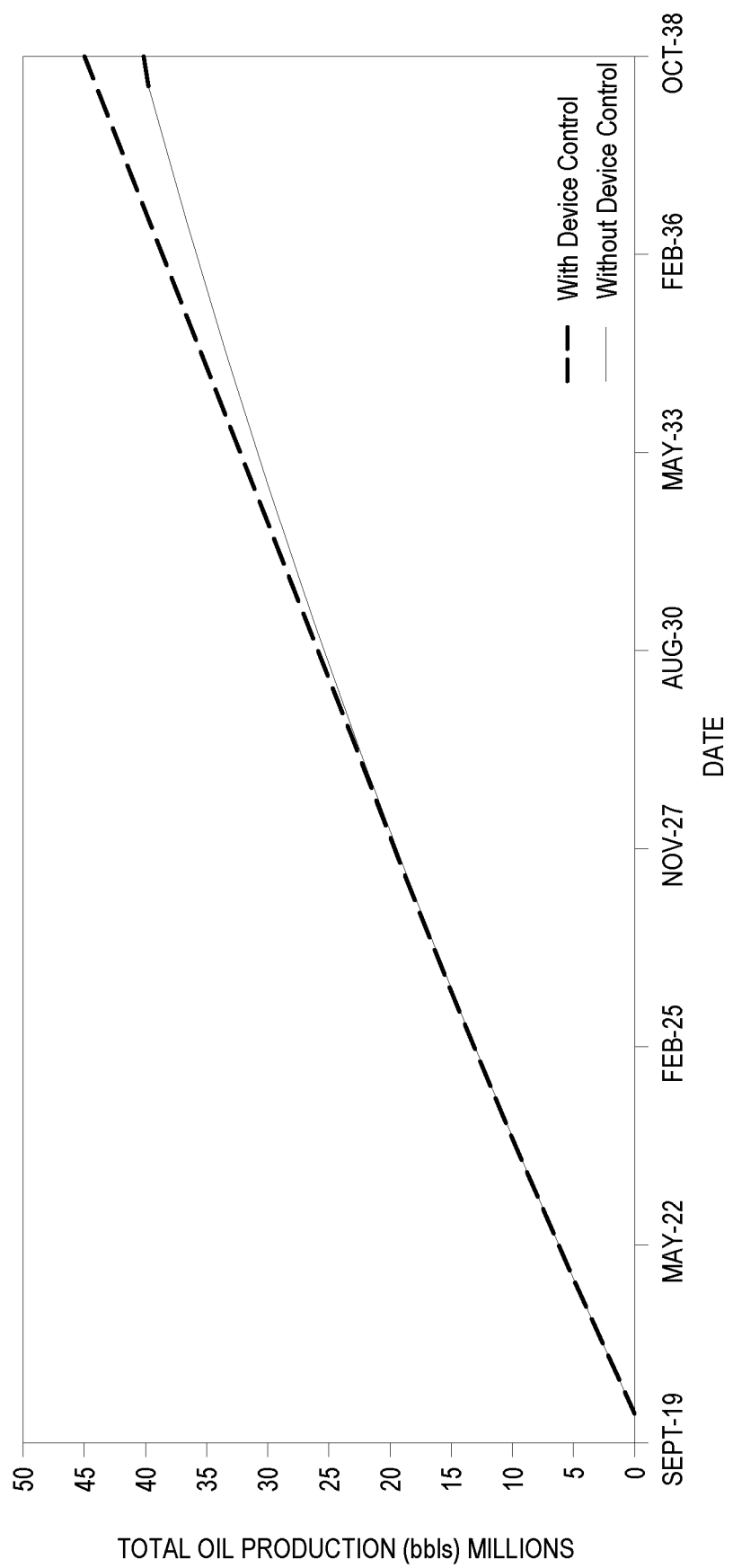

FIG. 10 shows the water cut percentage during the simulations. As shown in FIG. 10, with device control, the well is below its target water cut during the simulation. As also shown in FIG. 10, the water cut with device control case is 20% lower than the water cut without device control. FIG. 11 shows the total oil production during the simulations. As shown in FIG. 11, the total oil production with device control is 10% greater than the total oil production without device control. The results of FIG. 10 and FIG. 11 illustrate that well performance is better with device control.

FIGS. 12, 13, 14A, 14B, and 15 illustrate a second simulation example that implements the disclosed framework, according to some implementations. In the second simulation example, the device control is used to simulate a field level application. The field model has 100 complex wells with 20 injectors and 80 producers. Half of the producers are installed with multiple ICVs and the remaining half do not have any devices. The simulation simulates a period of 50 years with a facility constraint of 100,000 bbl/day of oil production limit in the GOSP. The objective of the simulation is to achieve an optimal GOSP performance with device control. In the second simulation example, three different scenarios are simulated. The scenarios are: (i) a simulation without any device control, (ii) a simulation that includes a constraint of choking the ICVs when a well water cut reaches 70%, and (iii) a simulation that includes a constraint of choking the ICVs when a well water cut reaches 90%.

Figure 12:
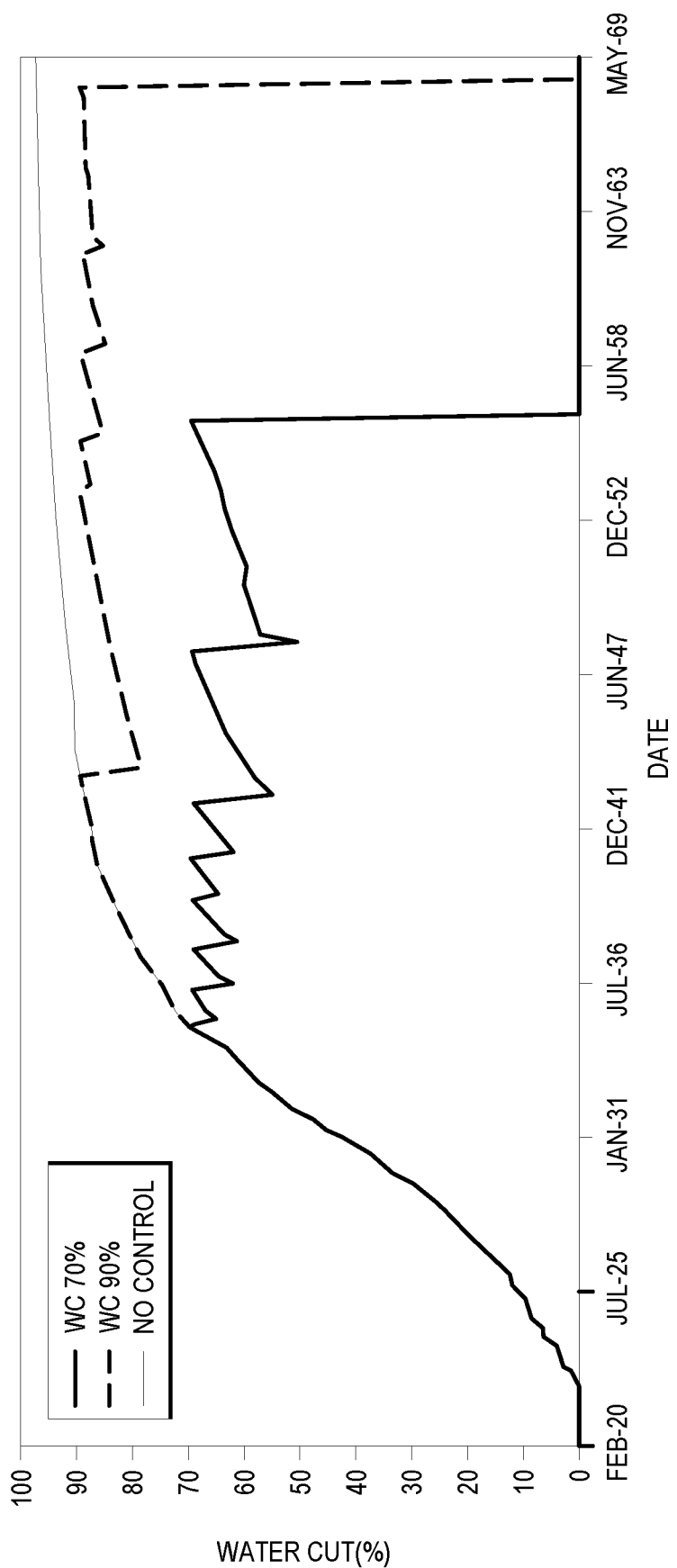
Figure 13:
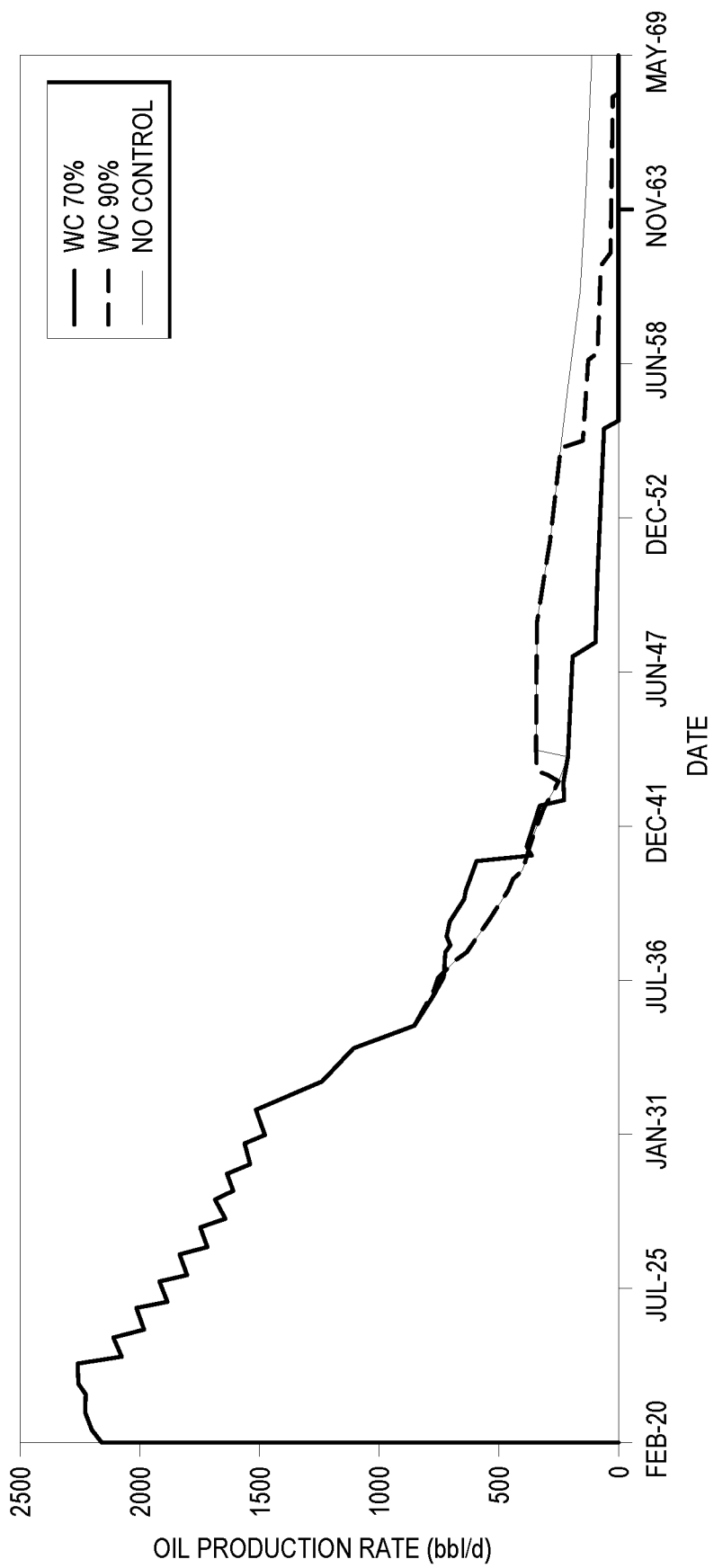

FIG. 12 and FIG. 13 illustrate a comparison of a single well performance in the three scenarios. The solid line (not bolded) represents performance of the first scenario (that is, without any device control), the bolded solid line represents performance of the second scenario (that is, choking the maximum water cut ICV when the well water cut reaches 70%), and the dashed line represents performance of the third case (that is, choking the maximum water cut ICV when the well water cut reaches 90%). FIG. 12 shows that with device control, when the well water cut is above the set limit, choking the ICVs limits the water cut from exceeding the limit until the well is shut in. On the other hand, the water cut keeps increasing in the case without any device control. FIG. 13 shows the oil production rate of the three cases. FIG. 13 shows that choking the device with high water cut may temporarily increase the oil production in the well since more oil is produced from other intervals. In a later period of time, the well without any device control will produce more oil with high water cut (for example, over 90%) compared with other two cases with device control.

Figure 14B:
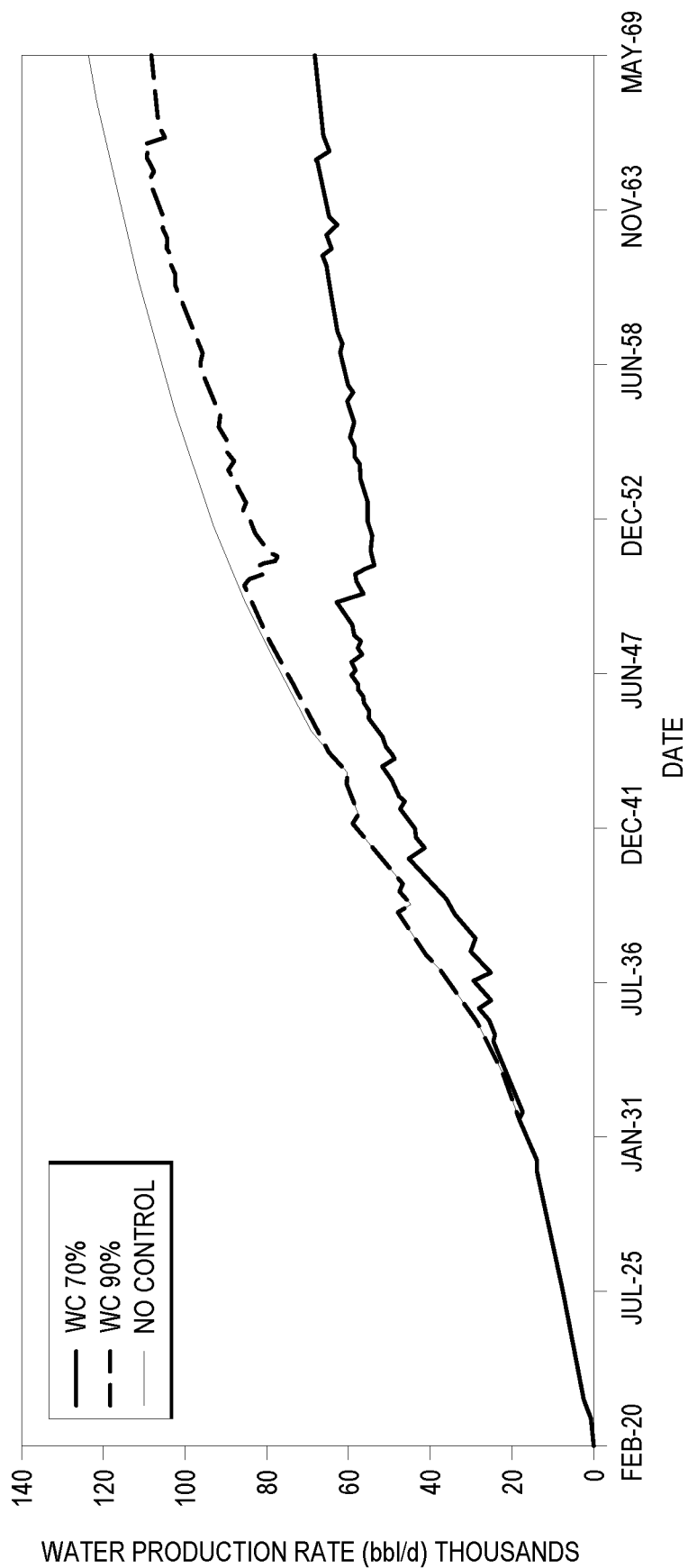

FIGS. 14A, 14B, and 15 illustrate a comparison of the overall GOSP performance. Specifically, FIG. 14A illustrates the field oil rate. As shown in FIG. 14A, the field oil rate is maintained at 100,000 bbl/day (the assumed GOSP limit) for about 20 years before declining. Compared with the base case without any device control (the solid line), the field oil rate for choking the maximum water cut at 70% case (the bolded solid line) shows an earlier decline and lower oil rate after the year 2050. This is because many wells reach 70% water cut and ICVs start choking in those wells. Therefore, those wells are eventually shut-in. However, when the ICVs are chocked when a well reaches water cut at 90%, then the field oil rate is higher than the base case in the entire simulation time. This is because the low water cut wells in the field are now producing more oil.

FIG. 14B and FIG. 15 show a comparison of the water production and water cut, respectively. FIG. 14B shows that the second case has significantly less water production than the base case. Although, the second case has a lower oil rate and the reduction in the water production is more than 50%. The third case also has about 10% less production in water and more oil production than the base case. FIG. 15 shows that both cases with device control have much lower water cut than the base case at the end of simulation time. In this example, the overall GOSP water production improves with the device control.

To summarize the examples, device control is applied in two scenarios. The first example involves a single injector and single producer. The second example involved a field application with over 100 wells. Both examples show positive results for using device control. Specifically, the examples demonstrate the advantages of using device control to choke ICVs when the water cut in a well reaches a threshold limit. The use of device control for choking the high water cut branch in a multi-lateral producer results in higher oil production and lower water cut. The systematic way to use device control in a field application with a total oil production target can reduce the water cut in wells with high water cut and can result in higher oil production in low water cut wells to meet the facility constraint. As such, device control improves the overall GOSP performance.

Figure 16:
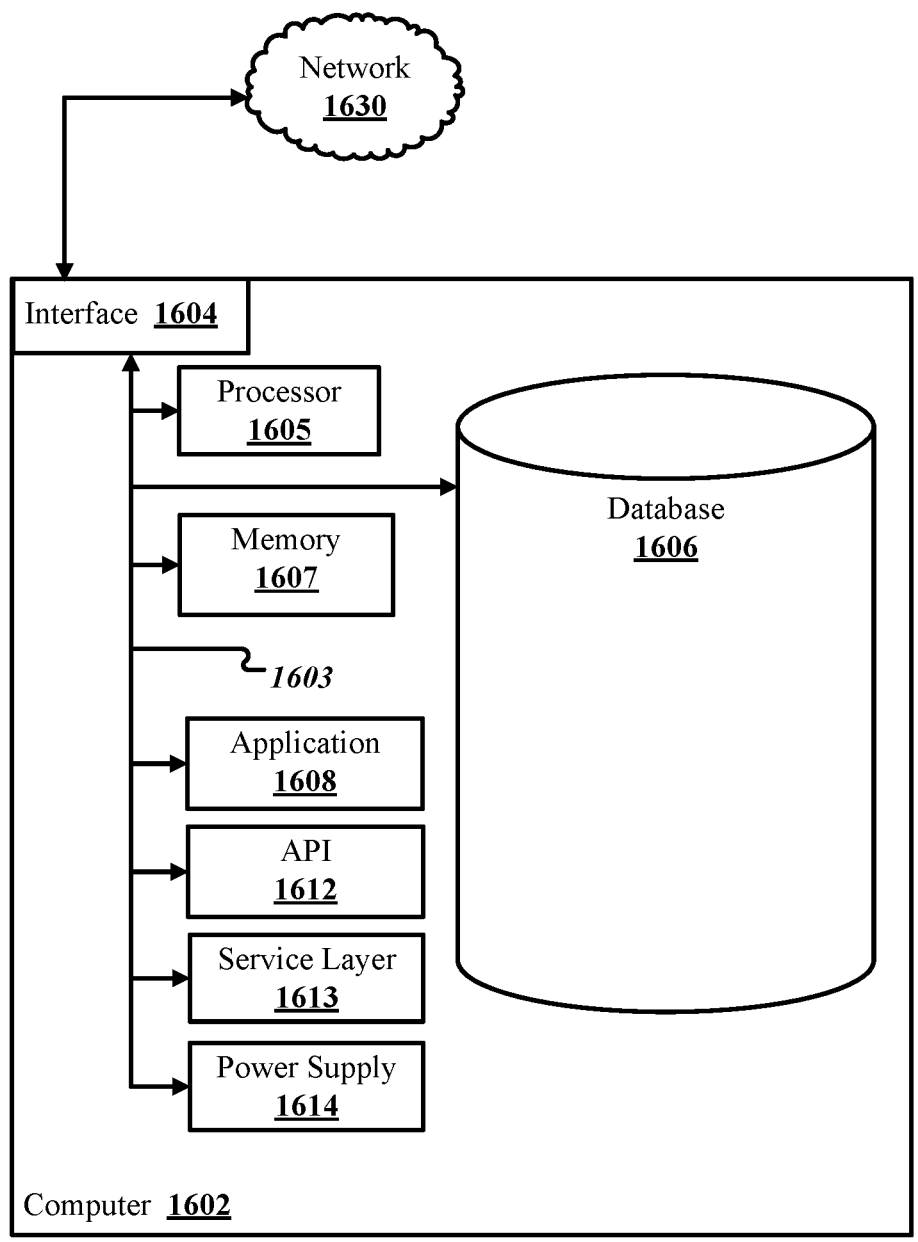
FIG. 16 illustrates a block diagram illustrating an example computer system used to provide computational functionalities associated with described algorithms, methods, functions, processes, flows, and procedures as described in the present disclosure, according to some implementations of the present disclosure.

FIG. 16 is a block diagram of an example computer 1600 used to provide computational functionalities associated with described algorithms, methods, functions, processes, flows, and procedures described in the present disclosure, according to some implementations of the present disclosure. The illustrated computer 1602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1602 can include input devices such as keypads, keyboards, and touch screens that can accept user information. Also, the computer 1602 can include output devices that can convey information associated with the operation of the computer 1602. The information can include digital data, visual data, audio information, or a combination of information. The information can be presented in a graphical user interface (UI) (or GUI).

The computer 1602 can serve in a role as a client, a network component, a server, a database, a persistency, or components of a computer system for performing the subject matter described in the present disclosure. The illustrated computer 1602 is communicably coupled with a network 1630. In some implementations, one or more components of the computer 1602 can be configured to operate within different environments, including cloud-computing-based environments, local environments, global environments, and combinations of environments.

At a high level, the computer 1602 is an electronic computing device operable to receive, transmit, process, store, and manage data and information associated with the described subject matter. According to some implementations, the computer 1602 can also include, or be communicably coupled with, an application server, an email server, a web server, a caching server, a streaming data server, or a combination of servers.

The computer 1602 can receive requests over network 1630 from a client application (for example, executing on another computer 1602). The computer 1602 can respond to the received requests by processing the received requests using software applications. Requests can also be sent to the computer 1602 from internal users (for example, from a command console), external (or third) parties, automated applications, entities, individuals, systems, and computers.

Each of the components of the computer 1602 can communicate using a system bus 1603. In some implementations, any or all of the components of the computer 1602, including hardware or software components, can interface with each other or the interface 1604 (or a combination of both), over the system bus 1603. Interfaces can use an application programming interface (API) 1612, a service layer 1613, or a combination of the API 1612 and service layer 1613. The API 1612 can include specifications for routines, data structures, and object classes. The API 1612 can be either computer-language independent or dependent. The API 1612 can refer to a complete interface, a single function, or a set of APIs.

The service layer 1613 can provide software services to the computer 1602 and other components (whether illustrated or not) that are communicably coupled to the computer 1602. The functionality of the computer 1602 can be accessible for all service consumers using this service layer 1613. Software services, such as those provided by the service layer 1613, can provide reusable, defined functionalities through a defined interface. For example, the interface can be software written in JAVA, C++, or a language providing data in extensible markup language (XML) format. While illustrated as an integrated component of the computer 1602, in alternative implementations, the API 1612 or the service layer 1613 can be stand-alone components in relation to other components of the computer 1602 and other components communicably coupled to the computer 1602. Moreover, any or all parts of the API 1612 or the service layer 1613 can be implemented as child or submodules of another software module, enterprise application, or hardware module without departing from the scope of the present disclosure.

The computer 1602 includes an interface 1604. Although illustrated as a single interface 1604 in FIG. 16, two or more interfaces 1604 can be used according to particular needs, desires, or particular implementations of the computer 1602 and the described functionality. The interface 1604 can be used by the computer 1602 for communicating with other systems that are connected to the network 1630 (whether illustrated or not) in a distributed environment. Generally, the interface 1604 can include, or be implemented using, logic encoded in software or hardware (or a combination of software and hardware) operable to communicate with the network 1630. More specifically, the interface 1604 can include software supporting one or more communication protocols associated with communications. As such, the network 1630 or the interface's hardware can be operable to communicate physical signals within and outside of the illustrated computer 1602.

The computer 1602 includes a processor 1605. Although illustrated as a single processor 1605 in FIG. 16, two or more processors 1605 can be used according to particular needs, desires, or particular implementations of the computer 1602 and the described functionality. Generally, the processor 1605 can execute instructions and can manipulate data to perform the operations of the computer 1602, including operations using algorithms, methods, functions, processes, flows, and procedures as described in the present disclosure.

The computer 1602 also includes a database 1606 that can hold data for the computer 1602 and other components connected to the network 1630 (whether illustrated or not). For example, database 1606 can be an in-memory, conventional, or a database storing data consistent with the present disclosure. In some implementations, database 1606 can be a combination of two or more different database types (for example, hybrid in-memory and conventional databases) according to particular needs, desires, or particular implementations of the computer 1602 and the described functionality. Although illustrated as a single database 1606 in FIG. 16, two or more databases (of the same, different, or combination of types) can be used according to particular needs, desires, or particular implementations of the computer 1602 and the described functionality. While database 1606 is illustrated as an internal component of the computer 1602, in alternative implementations, database 1606 can be external to the computer 1602.

The computer 1602 also includes a memory 1607 that can hold data for the computer 1602 or a combination of components connected to the network 1630 (whether illustrated or not). Memory 1607 can store any data consistent with the present disclosure. In some implementations, memory 1607 can be a combination of two or more different types of memory (for example, a combination of semiconductor and magnetic storage) according to particular needs, desires, or particular implementations of the computer 1602 and the described functionality. Although illustrated as a single memory 1607 in FIG. 16, two or more memories 1607 (of the same, different, or combination of types) can be used according to particular needs, desires, or particular implementations of the computer 1602 and the described functionality. While memory 1607 is illustrated as an internal component of the computer 1602, in alternative implementations, memory 1607 can be external to the computer 1602.

The application 1608 can be an algorithmic software engine providing functionality according to particular needs, desires, or particular implementations of the computer 1602 and the described functionality. For example, application 1608 can serve as one or more components, modules, or applications. Further, although illustrated as a single application 1608, the application 1608 can be implemented as multiple applications 1608 on the computer 1602. In addition, although illustrated as internal to the computer 1602, in alternative implementations, the application 1608 can be external to the computer 1602.

The computer 1602 can also include a power supply 1614. The power supply 1614 can include a rechargeable or non-rechargeable battery that can be configured to be either user- or non-user-replaceable. In some implementations, the power supply 1614 can include power-conversion and management circuits, including recharging, standby, and power management functionalities. In some implementations, the power supply 1614 can include a power plug to allow the computer 1602 to be plugged into a wall socket or a power source to, for example, power the computer 1602 or recharge a rechargeable battery.

There can be any number of computers 1602 associated with, or external to, a computer system containing computer 1602, with each computer 1602 communicating over network 1630. Further, the terms "client," "user," and other appropriate terminology can be used interchangeably, as appropriate, without departing from the scope of the present disclosure. Moreover, the present disclosure contemplates that many users can use one computer 1602 and one user can use multiple computers 1602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

What is claimed is:

1. A computer-implemented method for simulating performance of a reservoir that includes a wellbore, the method comprising:
    receiving a simulation input file, wherein the simulation input file defines a constraint for an intelligent completion in a model of the wellbore, wherein:
        the constraint: (i) defines how the intelligent completion reacts in response to reservoir conditions, and (ii) comprises a condition and a responsive action;
        the condition comprises an equality, an inequality, or a combination of multiple conditions using logical operators, and
        the responsive action comprises at least one of: changing an open/close status of the intelligent completion or gradually choking the intelligent completion;
    performing, in response to determining that the condition is satisfied, the responsive action;
    determining, in response to performing the responsive action, transfer equations for the model of the wellbore;
    building, using the transfer equations, a wellbore computation matrix for the model of the wellbore;
    solving the wellbore computation matrix and determining that a solution to the wellbore computation matrix has converged to an acceptable tolerance;
    responsively determining that the converged solution is indicative of flow in the model of the wellbore;
    determining, based on the converged solution, a location of a well to be drilled; and
    drilling, based on the determination of the location of the well to be drilled, the well at the determined location,
    wherein the transfer equations comprise a momentum balance equation for the intelligent completion, and
    wherein the momentum balance equation comprises a term that accounts for a pressure drop across a flow control device of the intelligent completion.

2. The computer-implemented method of claim 1, wherein the acceptable tolerance is a first acceptable tolerance, and the method further comprising:
    building a reservoir computation matrix for a model of the reservoir;
    solving the reservoir computation matrix and determining that a solution to the reservoir computation matrix has converged to a second acceptable tolerance; and
    responsively determining that the converged solution is indicative of flow in the model of the reservoir.

3. The computer-implemented method of claim 1, wherein the transfer equations further comprise a mass balance equation.

4. The computer-implemented method of claim 1, wherein the model of the wellbore is a complex well network that is generated using a general network approach.

5. A non-transitory computer-readable medium storing one or more instructions executable by a computer system to perform operations for simulating performance of a reservoir that includes a wellbore, the operations comprising:
    receiving a simulation input file, wherein the simulation input file defines a constraint for an intelligent completion in a model of the wellbore, wherein:
        the constraint: (i) defines how the intelligent completion reacts in response to reservoir conditions, and (ii) comprises a condition and a responsive action;
        the condition comprises an equality, an inequality, or a combination of multiple conditions using logical operators, and
        the responsive action comprises at least one of: changing an open/close status of the intelligent completion or gradually choking the intelligent completion;
    performing, in response to determining that the condition is satisfied, the responsive action;
    determining, in response to performing the responsive action, transfer equations for the model of the wellbore;
    building, using the transfer equations, a wellbore computation matrix for the model of the wellbore;
    solving the wellbore computation matrix and determining that a solution to the wellbore computation matrix has converged to an acceptable tolerance;
    responsively determining that the converged solution is indicative of flow in the model of the wellbore; and
    determining, based on the converged solution, a location of a well to be drilled; and
    drilling, based on the determination of the location of the well to be drilled, the well at the determined location,
    wherein the transfer equations comprise a momentum balance equation for the intelligent completion, and
    wherein the momentum balance equation comprises a term that accounts for a pressure drop across a flow control device of the intelligent completion.

6. The non-transitory computer-readable medium of claim 5, wherein the acceptable tolerance is a first acceptable tolerance, and the operations further comprising:
    building a reservoir computation matrix for a model of the reservoir;
    solving the reservoir computation matrix and determining that a solution to the reservoir computation matrix has converged to a second acceptable tolerance; and
    responsively determining that the converged solution is indicative of flow in the model of the reservoir.

7. The non-transitory computer-readable medium of claim 5,
    wherein the transfer equations further comprise a mass balance equation.

8. The non-transitory computer-readable medium of claim 5, wherein the model of the wellbore is a complex well network that is generated using a general network approach.

9. A system for simulating performance of a reservoir that includes a wellbore, the system comprising:
    one or more processors; and
    a non-transitory computer-readable storage medium coupled to the one or more processors and storing programming instructions for execution by the one or more processors, the programming instructions instructing the one or more processors to perform operations comprising:
        receiving a simulation input file, wherein the simulation input file defines a constraint for an intelligent completion in a model of the wellbore, wherein:
            the constraint: (i) defines how the intelligent completion reacts in response to reservoir conditions, and (ii) comprises a condition and a responsive action;
            the condition comprises an equality, an inequality, or a combination of multiple conditions using logical operators, and
            the responsive action comprises at least one of: changing an open/close status of the intelligent completion or gradually choking the intelligent completion;
        performing, in response to determining that the condition is satisfied, the responsive action;
        determining, in response to performing the responsive action, transfer equations for the model of the wellbore;
        building, using the transfer equations, a wellbore computation matrix for the model of the wellbore;
        solving the wellbore computation matrix and determining that a solution to the wellbore computation matrix has converged to an acceptable tolerance;
        responsively determining that the converged solution is indicative of flow in the model of the wellbore;
        determining, based on the converged solution, a location of a well to be drilled; and
        drilling, based on the determination of the location of the well to be drilled, the well at the determined location,
    wherein the transfer equations comprise a momentum balance equation for the intelligent completion, and
    wherein the momentum balance equation comprises a term that accounts for a pressure drop across a flow control device of the intelligent completion.

10. The system of claim 9, wherein the acceptable tolerance is a first acceptable tolerance, and the operations further comprising:
    building a reservoir computation matrix for a model of the reservoir;
    solving the reservoir computation matrix and determining that a solution to the reservoir computation matrix has converged to a second acceptable tolerance; and
    responsively determining that the converged solution is indicative of flow in the model of the reservoir.

11. The system of claim 9, wherein the transfer equations further comprise a mass balance equation.

\* \* \* \* \*